United States Patent [19]

Bucco et al.

[11] 4,036,656

[45] July 19, 1977

[54] FOAMED MASTIC COMPOSITION, BUILDING ARTICLES COATED THEREWITH, AND METHOD OF PREPARING SAME

[75] Inventors: Mario P. Bucco, Annandale; Alvin Van Valkenburg, McLean, both of Va.

[73] Assignee: The Mearl Corporation, Ossining, N.Y.

[21] Appl. No.: 608,890

[22] Filed: Aug. 29, 1975

Related U.S. Application Data

[60] Division of Ser. No. 3,528, Jan. 16, 1970, abandoned, which is a continuation-in-part of Ser. No. 560,940, Jan. 13, 1966, abandoned, which is a continuation-in-part of Ser. No. 430,470, Jan. 4, 1965, abandoned.

[51] Int. Cl.² .................................................. C04B 9/04
[52] U.S. Cl. ........................................ 106/88; 106/107
[58] Field of Search ................. 106/88, 105, 106, 107; 427/403, 427

[56] References Cited

U.S. PATENT DOCUMENTS

| 2,017,022 | 10/1935 | Roos ..................................... 106/88 |
| 2,598,980 | 6/1952 | Denning ................................ 106/88 |
| 2,598,981 | 6/1952 | Denning ................................ 106/88 |
| 2,602,759 | 7/1952 | Mollo ................................... 427/427 |
| 3,147,128 | 9/1964 | Harrell ................................. 106/105 |
| 3,369,929 | 2/1968 | Petersen .............................. 427/427 |

Primary Examiner—J. Poer
Attorney, Agent, or Firm—Ostrolenk, Faber, Gerb & Soffen

[57] ABSTRACT

The invention disclosed is for an improved foamed mastic composition comprising a magnesia cement, building articles coated therewith in light porous foamed form having improved fire resistant and sound insulating properties, and a method of preparing such articles and composition.

The foamed mastic composition prepared by the present invention is pumpable and sprayable, and upon setting or drying provides a highly porous, firmly-bonded coating upon metallic building members.

7 Claims, No Drawings

FOAMED MASTIC COMPOSITION, BUILDING ARTICLES COATED THEREWITH, AND METHOD OF PREPARING SAME

This is a division of Ser. No. 3,528, filed Jan. 16, 1970, now abandoned, which is a continuation-in-part of co-pending U.S. application Ser. No. 560,940, filed June 13, 1966 now abandoned; which in turn is a continuation-in-part of U.S. application Ser. No. 430,470, filed Feb. 4, 1965, now abandoned.

The present invention relates to an improved foamed mastic composition which comprises a magnesia cement, building articles coated therewith in light porous foamed form having improved fire resistant and sound insulating properties, and to a method of preparing such articles and composition.

Heretofore it has been proposed in the art to reduce the density of a hydraulic or portland cement by inclusion of a foam using various types of foaming agents for forming such foam. That cement, inherently quite heavy and containing ordinary heavy solids or aggregates as fillers, is more porous and lighter, but the foam introduced in such heavy material tends quickly to break and is not sprayable. For instance, the foam cement of that type occludes only a small quantity of air such as about 20% and these air bubbles are not stable so that upon emplacement, the resulting concrete, somewhat lighter, is still non-porous with respect to that of the present invention. The ultimate mastic formed from such concrete, moreover, is too heavy to usefully apply as a sprayed coating upon structural building elements. Moreover, such coating is not sufficiently porous, nor would it firmly bond to a metallic building element, nor would it be sufficiently light and porous to be easily spread thereon.

The composition of the present invention is a magnesia cement and prefoamed animal protein hydrolyzate which includes, as a fire retardant and foam stabilizing filler, one which either retains water in its natural mineral condition such as asbestos fiber, or is one which absorbs water from the mastic composition as compounded in the formation of the initial slurry. Equally important, the filler material of this invention cooperates with the foaming and bonding agent, a hydrolyzed animal protein, to include a larger quantity of air, usually exceeding 40 volume percent, in the form of small substantially stable bubbles, rendering the mastic composition easily pumpable and sprayable, the bubbles remaining in the final composition on setting to provide a light weight, firmly bonded, porous mastic upon the building element to which it is applied. The mastic composition of the invention thus comprises a combination magnesia cement, a fire retardant foam stabilizing filler and a prefoamed animal protein hydrolyzate.

The animal protein hydrolyzate foaming and bonding agent may be characterized as a protolysate or an artifical digest of animal protein derived by acid, alkali, enzymatic or other hydrolysis of such animal proteins as casein, lactalbumin, fibrin, as well as their commercial protein forms such as dried blood, albumin, fish meal, feather meal, hoof and horn meal or other suitable proteins that supply the approximate amino acid equivalent of the source protein in the form of its constituent amino acids. These are required to have more than half of the total nitrogen present in the form of alpha-amino nitrogen.

A second component of the present mastic composition is the magnesia cement which comprises magnesium oxide and a magnesium salt selected from a group consisting of magnesium chloride and magnesium sulfate. These materials provide the magnesium oxychloride and oxysulfate cements well-known to the art. Generally, the mixtures are composed of magnesium oxide, (plastic calcined acoustic magnesia), magnesium chloride and/or magnesium sulfate solutions, and various aggregates or mixtures of aggregates as filler materials.

In making mastic compositions of such materials, optimum strengths require a fairly definite ratio between the magnesium oxide or magnesite, and the concentration of the magnesium chloride or magnesium sulfate solutions. Magnesium oxychloride cements otherwise identified as sorel cement are obtained therefore when magnesia is mixed with a solution of about 20% magnesium chloride followed by a reaction with evolution of heat and formation of the oxychloride or the related reaction for the preparation of the oxysulfate.

The mastic composition includes an inorganic fire resistant filler material by the type which evolves moisture and/or expands upon heating, preferably fibers such as asbestos, although other fire resistant related materials such as mica may be readily included as desired. These materials are readily included in the mastic composition to provide and/or improve the fire resistant and sound insulating properties of the mastic composition.

The foamed mastic composition of the present invention is characterized as being of relatively light foamy texture, occluding some 40 to 60 volume percent of air bubbles which are stable to be pumpable and sprayable when mixed with the prefoamed foaming agent, and upon setting or drying provides a firmly-bonded, very light, highly porous coating which effectively coats and firmly bonds to the metallic building structures and imparts fire retardant properties to the structural element. These structures or elements include fire doors, I-beams, duct work, prefab wall panels and related surfaces. Numerous other articles or structural elements may be readily coated by the present mastic composition as may be desired.

The method of the present invention generally requires preparation of a slurry of a mastic composition containing magnesia cement and filler, preparation of a foamed protein hydrolyzate, introduction of the foamed protein hydrolyzate into the slurry mix, and thereafter application by spraying of the hydrolyzate containing slurry as a coating upon such metallic building member. It is found in the practice of the present invention, that it is critical that the protein hydrolyzate be foamed prior to introduction to the slurry of magnesia cement to result in a highly porous, firmly-bonded coating which effectively provides fire resistant and sound insulating properties while avoiding numerous disadvantages typically inherent in prior art compositions and methods of application. Accordingly, by practice of the present invention which requires the foaming of an animal protein hydrolyzate prior to addition to a magnesia cement to convert the cement to porous form for application to even metallic building structures, there is provided an unexpected utility for a new composition available in the prior art.

A preferred foaming agent utilized as animal protein hydrolyzate in the practice of the present invention is that available under the mark Airocel by the Mearle Corporation of New Jersey. These foaming agents may be characterized as protein hydrolyzates derived from animal protein residues such as hoof and horn meal which is hydrolyzed with a strong hydrolyzing agent such as sodium hydroxide or the like.

In general, the animal protein hydrolyzate may be prepared for use according to the present invention by taking animal protein material such as hoof and horn meal to which water is added and then heated and stirred to a substantial uniform mixture. Thereafter, a material such as lime may be added along with sodium hydroxide. The mixture is then slowly mixed for a period of time of about 7 to 10 hours; usually about 8 hours, and heated at about 200° F., after which an acid such as sulfuric acid is added sufficient to adjust the pH to about pH 3 to pH 5. The acidified hydrolyzate is subsequently heated to a temperature of about 190° F. for an additional period of time of 1 to 2 hours; usually 1½ hours, during which the reaction mixture is continuously stirred. Thereafter, the pH of the mixture is adjusted to pH about 8 by addition of lime. The hydrolyzate so produced is then filtered and finally evaporated to a density of about 1.2 lbs. per cubic foot to provide a liquid. The liquid is then combined with stirring over a period of time usually about 15 minutes with sodium sulfate disposed in hot water. The hydrolyzate is then heated to about 220° F. and then has added with constant agitation a calcium chloride solution compounded with isopropanol in water. Mixing of the hydrolyzate may then be continued for an additional period of time of about one hour. The resulting product is foamed hydrolyzed animal protein by additions of a small quantity of water and air under pressure in a foaming device and the foam is then ready for addition to the slurry mastic composition.

In general, the animal protein hydrolyzate hereof may also be prepared by methods disclosed in U.S. Pat. Nos. 2,324,951; 2,368,623; and 2,481,875, 2,864,714.

After the foamed mastic composition of the present invention has been prepared, it may be applied by spraying upon any metallic structure typically used in the building industry. The foamed mastic composition may readily adhere to any metallic material that is commercially used to make for example I-beams, decks including those formed of steel, stainless steel, galvanized steel, galvanized iron, morel metal, aluminum or alloys of these various materials.

The foamed mastic composition containing a magnesia cement and a foamed animal protein hydrolyzate may be combined in any mixing device including a cement mixer or the like as desired including a plasters mixer. The mixing of the cement slurry with the prefoamed animal protein foam requires only a short time, usually less than 10 minutes. Mixing, of course, is discontinued when the desired foam mastic volume is reached. The foam volume or density of the foamed mastic composition of the present invention will usually be in the range of about 8 lbs. per cubic foot to about 30 lbs. per cubic foot depending upon the extent of mixing, the aggregate used, and other variables encountered in the process.

In the usual practice of the present invention, a sufficient quantity of water at a temperature between about 32° F. and 180° F. is first mixed with a protein hydrolyzate to be foamed. The foaming agent will usually constitute between about 0.10 and about 5% of the dry weight of the foamed mastic composition, or preferably about 0.10 to about 1% by weight of the dry weight of the foamed mastic composition.

Preferably, the present invention usefully provides a premix of foam combined with a mastic composition containing magnesia cement. The protein hydrolyzate may be first combined with water and then foamed under high air pressure varying between 50 psig. to about 150 psig. This preliminary foaming of the protein hydrolyzate may be carried out using most any conventional foamed generator where aeration is accomplished to provide a desirable prefoamed protein hydrolyzate. After the animal protein hydrolyzate has been foamed, it is mixed with a prepared slurry of mastic composition containing a magnesia cement to effectively provide a fire resistant and sound insulating composition when applied to a metallic building structure. Upon application by spraying, the pressure upon the mastic as it leaves the spray applicator may vary between about 40 to 125 psig.

The mixed ratio of concentrated protein hydrolyzate varies when combined with water in an amount of about one gallon of protein hydrolyzate such as that available under the mark Airocel to about 8 to 25 gallons of water (i.e. 4–12.5% by volume of foaming agent in water) depending upon the density of the foam desired. Under air pressure varying up to about 100 psig and the requisite mixing time, application of a foamed protein hydrolyzate to a mastic composition containing a magnesia cement may require a pumping time in a foam generator varying from about 20 to 60 seconds.

In the mixing procedure of the present invention, it is considered critical to first prepare a slurry of a magnesia cement with the foam stabilizing fire retardant filler and thereafter mix therewith the prefoamed animal protein hydrolyzate over a period of 2 to about 10 minutes. While a longer mixing time may be used, the porousity of the mastic for spraying is not increased.

On one embodiment of the present invention, 50 pounds of magnesia containing cement including an aggregate or filler such as asbestos is combined with from about 8 to about 12 gallons of water. It is surprisingly found that when the solid mix comprises a 50 pound charge, this quantity of water should be increased in volume, depending upon the level to which the operator expects to pump the foamed cement in order to obtain and retain a product of acceptable density. Accordingly, when the foamed cement is to be pumped to a third floor level, such as by spraying, a 50 pound charge of solid material may be made up of about 5 to 8 parts by weight of magnesium sulfate $7H_2O$ and/or magnesium chloride about 4 to 9 parts by weight of magnesium oxide and about 41 to 33 parts by weight of asbestos shorts or equivalent foam stabilizing fire resistant filler (i.e., 8–18 parts by weight magnesia, 10–16 parts by weight magnesium salt and 66–82 fibrous constituent in a 100 pound charge). These various dry materials are mixed with approximately about 10 to about 14 gallons of water (i.e, 166–234 parts by weight of water for a 100 pound charge) for about 1 to 2 minutes to form a magnesia cement slurry. There is then added a volume of the prefoamed animal protein hydrolyzate obtained from the foaming device at a pressure of about 100 psi, such foam being sufficiently characterized for use after 20 to about 60 seconds of foam generation. The prefoamed protein hydrolyzate comprises about one gallon of concentrated protein hydrolyzate per about ten gallons of water. The total quantity of water present in the sprayable foamed mastic composition may vary from approximately 20 to about 400% by weight of the solids including the foaming agent, and, more particularly, from about 25 to about 150% by weight of the dry mastic composition including both the magnesia cement and protein hydrolyzate. Expressed otherwise, the water content may vary from about 60 to about 80% by weight of the total weight of the mixed mastic material applied, giving a density from about 8 to 30 pounds per cubic foot.

The stabilized foamed mastic composition includes fillers such as mica, vermiculite, shale, granulated shell, asbestos, calcined calcium sulfate and other known hydrous aggregates. Such fillers tend to stabilize the foam during the pumping, spraying and setting stages to form a highly porous coating. Such fillers usefully either retain water in their natural mineral condition or absorb water from the mastic composition. Upon setting, such inert fillers typically contain chemically bonded water. This type of filler tends upon heating, as in the case of a high temperature encountered during a fire, to evolve moisture while correspondingly absorbing substantial quantities of heat such as heat of vaporization or dissociation of the hydrated filler, which tends to cool and thus to enhance the fire retardant properties of the coating material. Moreover, the strength of the coating applied is further enhanced by use of fibrous fillers of the character of asbestos which further aids the cohesion of the mastic composition.

The protein hydrolyzates useful herein are desirably animal protein hydrolyzates such as hoof and horn meal, dried blood, albumin, fish meal and related protein hydrolyzates which may be typically hydrolyzed with strong caustic such as sodium hydroxide. These materials are typically found to be superior to other non-ionic foaming agents as well as other protein hydrolyzates in that the materials foam better in the prefoamed state and, upon addition to the magnesia cement slurry, result in an improved foamed mastic composition which effectively adheres to the metallic bonding structures.

Typical foamed mastic compositions may be prepared, for example, by combining a mixture of about 10 to about 40 parts by weight of calcined magnesite and from about 10 to about 20 parts by weight of an inert filler. These materials may be combined with from about 10 to about 40 parts by weight of 18° to about 22° Be solution of magnesium chloride. The fillers are preferably added in an amount varying between 10% to about 90% by weight based on the total weight of the solid compounds forming the magnesia cement.

When it is desirable to coat a relatively smooth base article such as a structural steel beam, the present mastic composition is applied and appears in dry and set form as small finite pores in a cement matrix. When a water-soluble mastic composition is applied, it appears that the water soluble component goes into solution and then upon hydrolysis of the mixture forms a complex hydrated porous cement wherein the soluble component builds up crystals in the interstices. The building of these cyrstals form infinitely small nuclei of material in solution which form crystals which appear to form a locking physical bond with smooth surfaces and this thus theoretically provides the unusually tenaceous adherence of the porous cement to a metallic based material. These crystals or nuclei appear to grow into micro cracks, grain boundaries or other irregularities always found on smooth surfaces of articles formed of metallic compositions, to allow a strong physical bond to be obtained.

It is also generally found important for practice of the present invention that the pH of the magnesia cement be maintained within the range of about pH 6.0 to about 9.0 with the average pH ranging, for example, magnesia sulfate in the range of about pH 8 to about pH 8.5. It is important that the mastic composition be almost pH neutral so that the composition will not chemically react with other materials, particularly with metals to which the composition is to be applied. The pH may be adjusted to be within the range indicated by addition of small amounts of acids such as sulfuric acid or hydrochloric acid when the pH is too high; or by addition of lime or sodium hydroxide when the pH is too low.

The following examples are provided to further illustrate the practice of the present invention:

EXAMPLE I

A protein hydrolyzate satisfactory for production of a foam prior to incorporation within a magnesia cement is prepared by adding 10 pounds of hoof and horn meal to 10 gallons of water and heating to about 200° F. The mixture is stirred for about 15 minutes. To this mixture is next added about 2 pounds of lime and about 4 ounces of concentrated sodium hydroxide. The resulting composition is slowly mixed for approximately 8 hours at a temperature of 200° F. Thereafter, about 1 pint of concentrated sulfuric acid is added and the pH of the system is adjusted to approximately pH 4.5. This acidified hydrolyzate is then heated at a temperature of about 190° F for an additional 1½ hours during which the system is continuously stirred. Thereafter the pH is again adjusted to pH 8 by addition of approximately 2 pounds of lime. The animal protein hydrolyzate so produced is then filtered and evaporated to a density of about 1.2 pounds per cubic foot to provide a liquid which is then slowly added with stirring over a period of about 15 minutes to an aqueous solution of 3 pounds of sodium sulfate disposed in ½ gallon of hot water. The hydrolyzate is then heated to 220° F and thereafter is added with constant stirring to a calcium chloride solution combined with 1 quart of isopropanol and ¼ quart of water. Mixing is continued for an additional hour. The resultant product provides a foam forming protein hydrolyzate useful for practice of the present invention. The product prepared by the procedure of Example I is approximated by a commercially available product identified by the tradename Airocel produced by the Mearl Corporation of New Jersey.

EXAMPLE II

A foamed mastic composition intended for spraying was prepared by first adding about 50 pounds of 7M-asbestos fibers to about 7 pounds of calcined magnesite and about 6 pounds of magnesium sulfate. These materials were combined to form a magnesium oxysulfate cement by first placing the three dry materials into a standard plasterers mixer. 9 gallons of water were next added and the materials in the water were agitated for 2 to 3 minutes to form a slurry. Thereafter about 8 fluid ounces of animal protein hydrolyzate liquid concentrate prepared by the procedure of Example I was added to the slurry and the slurry was agitated for a period of about 40 minutes. At this time, the material had a foamy characteristic with considerable air being occluded in the mixture. There appeared to be as many bubbles forming as were broken but the mixture proved to be quite heavy and lumpy. The mixture was pumped through a 250 foot hose and then through a nozzle and sprayed with great difficulty upon a metal duct, the dimensions of which were 24 inches by 24 inches by 10 feet high and formed of 16 gauge sheet metal. The coating of slurry formed upon the duct was found to be about 1/18 inch thick. The mixture was heavy and there appeared to be too few air bubbles entrained in the material being sprayed such that the mastic composition was neither light nor homogeneous but contain heavy spots. The dried coating upon the duct was tested by passing hot furnace gases through the duct. Sloughing off most of the coating upon the dust resulted within about 47 minutes.

EXAMPLE III

The procedure of Example II was repeated except that simultaneously 8 fluid ounces of the protein hydrolyzate prepared by the procedure of Example I was separately foamed in a foam generator with air under a pressure of about 100 psig. with a small approximately equal quantity of water. The foam from the generator was ladled as formed into the slurry of the mastic composition. Mixing of the preformed foam with the slurry was effected over a period of about 1 minute. This provided sufficient time to distribute the foamed protein hydrolyzate in the slurry substantially evenly throughout. This foamy mixture of cement slurry and preformed foam was next pumped through a 250 foot hose and nozzle as in Example II and thereafter sprayed upon a similarly sized metal duct surface. A coating thickness of about 1⅛ inches was realized thereon. The material sprayed was found to have a consistency of light foam in texture with no heavy spots and which well adhered to the duct without falling off. The duct was similarly tested as in Example II using the same hot gases. After heating for 2 hours, compared with 47 minutes of Example II, none of the coating had sloughed off the duct despite the formation of a few minor cracks.

EXAMPLE IV

The procedure of Examples II and III were repeated except that no asbestos was used as part of the mastic composition. Corresponding results were realized in the respective examples indicating that the addition of a prefoamed animal protein hydrolyzate to a magnesia cement results in an improved foamed mastic composition over anything available in the prior art.

EXAMPLE V

The procedure of Example II and III was repeated except employing magnesium oxychloride cement in place of the prepared magnesium oxysulfate cement. Corresponding results were realized using a prefoamed animal protein hydrolyzate as compared to that experienced using a non-foamed protein hydrolyzate.

EXAMPLE VI

Two duct assemblies were constructed of 18 gauge galvanized steel with elbows disposed at the ceiling and base with an overall exposed height of about 10 inches. The ducts were anchored to a block wall with 16 gauge 2 inches by 4 inches by 2 inches steel sheet angles with 1 inches long drive pins anchored and ⅛ inch long No. 10 pan head sheet metal screws disposed in the duct. The spacing of the anchors was approximately 24 inches on center. The exposed surface of both ducts was thoroughly cleaned with a solution of vinegar and muriatic acid. A mastic composition was next prepared as follows:

18 pounds of 7M-asbestos was added to 9 pounds of magnesium oxide and 8 pounds of magnesium sulfate. These three dry components were thoroughly mixed with 6 gallons of water for about 3 minutes. At the end of this 3 minute mixing period, a prefoamed animal protein hydrolyzate in an amount of about 1¼ ounces was added from a foam generator operated at about 100 psig. of compressed air with an equal quantity of water being added to a concentrated protein hydrolyzate. The prefoamed protein hydrolyzate was then mixed with the cement slurry over a 3 minute period. This foamed cement was then sprayed onto the metal ducts to a thickness of about 1¼ inches on a first duct and a thickness of about ⅝ inch on a second duct. Tests were conducted using the ASTM E 119-61 furnace time-temperature curve. This test was conducted for a period of about 2¼ hours at which time the ducts withstood the effect of a steam hose stream of 30 psi for 2¼ minutes without breakthrough. The average furnace temperature during the time of the test discussed having a surface of about 1¼ inches was varied between about 959° F. to about 1887° F. The duct containing the ⅝ inch coating experienced an average furnace temperature between about 455° F. and about 1832° F. A corresponding test conducted over a period of 2¼ hours indicated that the duct withstood the effects of a steam hose stream of 30 psig for 2½ minutes without breakthrough.

EXAMPLE VII 268 parts of water at a temperature of 100° F. was added to provide a mixture of 1.5 parts by weight of animal protein hydrolyzate prepared by the procedure of Example I. The mixture was foamed under approximately 100 psig. compressed air in a foam generator. This foamed hydrolyzate was next added to a 2 minute premixed slurry of mastic cement prepared from 180 grams of magnesium oxide and 300 grams of magnesium sulfate with 240 grams of asbestos shorts and 5 gallons of water. After agitation of the foam with the slurry for approximately an additional 5 minutes, the mixture formed a fluid which was pumpable and sprayable. This foamed mastic cement was sprayed upon a steel sheet base to a thickness of about 1.2 inches. The coating after hardening for about 2 hours was found to have excellent heat and sound insulating properties and the coating did not crack when subjected to an open red flame for about 20 minutes.

EXAMPLE VIII

To 300 parts of water was added 25 grams of dry animal protein hydrolyzate powder. This material was agitated for a few minutes at 65° F. and thereafter exposed to an air pressure of about 105 psig. in a foam generator. The foamed hydrolyzate was then mixed with a magnesia cement slurry prepared from about 300 grams of magnesium sulfate and about 200 grams of magnesium oxide. The cement slurry further contained about 50 grams of asbestos shorts and about 4 gallons of water. The cement slurry mixed the prefoamed hydrolyzate and provided a light foamed slurry in about 6 minutes of mixing that was sprayed upon a metal air conditioning duct to a thickness of approximately 1 inch. This coating demonstrated excellent fire proofing properties.

EXAMPLE IX 500 grams of water at a temperature of about 50° F. was mixed with about 50 grams of animal protein hydrolyzate prepared by the procedure of Example I and the mixture was foamed in a foam generator using high pressure air. This prefoamed hydrolyzate was added to a magnesia cement slurry in water prepared by using 200 grams of magnesium oxide, 200 grams of magnesium sulfate and 75 grams of finely divided expanded mica. After agitation for approximately 5 minutes, the prefoamed hydrolyzate was added to the slurry and mixed for an additional period of about one minute to form a light, smooth, fluid, foamed slurry. This foam was sprayed onto a metal base to a thickness of approximately ¾ inch. The coating after drying for approximately 4 hours was found to have excellent metal fire proofing characteristics as well as excellent sound proofing properties.

EXAMPLE X

The procedure of Example IX was repeated with the exception that 100 grams of unexpanded vermiculite was substituted for the mica. The slurry was prefoamed at 40° F. and sprayed on a steel I-beam to a thickness approximating 1 inch. After drying, the applied coating was found to provide excellent fire proofing insulating properties.

It is apparent from the foregoing that application of the present improved foamed mastic composition to building articles provides improved fire resistant and sound insulating properties and the coating is a far firmer bonded mastic composition upon the metallic building articles.

The mastic composition of the present invention not only provides a simple effective means for direct application to metallic surfaces without need for treating the metal either mechanically or chemically, but simultaneously provides a coating of improved strength and adhesion upon the substrate, generally free from cracks, with good fire retardant characteristics, and sound insulating properties. The coatings may be effectively applied in one application thus saving labor and other costs without sacrificing strength and safety including the safety of the applicator in application.

What is claimed is:

1. A method for the preparation and application of a foamed magnesia cement, which comprises:
   a. pre-forming an aqueous foam by aerating a solution of a hydrolyzed animal protein foaming agent in water;
   b. mixing magnesia, a magnesium salt selected from the group consisting of magnesium sulfate and magnesium chloride, and a foam stabilizing fire resistant filler in an aqueous slurry;
   c. adding the pre-formed form to said slurry to provide a pumpable and sprayable foam cement, the foamed cement having a wet density in the range of about 8 to 30 pounds per cubic foot;
   d. pumping the thus foamed cement to the point of application;
   e. spraying the foamed cement upon a suitable substrate to form a layer thereon; and
   f. air-drying said layer to convert the same to a foamed magnesia cement.

2. The method as defined in claim 1, in which the pre-formed foam is prepared in step (a) by admixing air with the solution of said foaming agent in a foam generator.

3. The method as defined in claim 1, in which the solution aerated in step (a) consists essentially of from 4–12.5% by volume of said foaming agent in water.

4. The method as defined in claim 3, in which the slurry to which the pre-formed foam is added in step (c) consists essentially of the following ingredients in the proportions specified:

| Ingredient | Parts by weight |
|---|---|
| Magnesia | 8–18 |
| Magnesium salt | 10–16 |
| Filler | 66–82 |
| Water | 166–234 |

5. The method as defined in claim 1, in which the slurry to which the pre-formed foam is added in step (c) consists essentially of the following ingredients in the proportions specified:

| Ingredient | Parts by weight |
|---|---|
| Magnesia | 8–18 |
| Magnesium salt | 10–16 |
| Filler | 66–82 |
| Water | 166–234 |

6. The method of claim 1 in which said filler is asbestos.

7. The method of claim 6, for the fireproofing of structural steel members, in which the pre-formed foam prepared in step (a) consists essentially of an aerated solution of from 4–12.5% by volume of a hydrolyzed protein foaming agent in water; and in which the aqueous slurry to which the pre-formed foam is added in step (c) consists essentially of from 8 to 18 parts by weight of magnesia, from 10–16 parts by weight of magnesium sulfate, from 66 to 82 parts by weight of asbestos fibers, and from 166 to 234 parts by weight of water.

* * * * *